United States Patent
Zhang et al.

(10) Patent No.: US 10,333,608 B2
(45) Date of Patent: Jun. 25, 2019

(54) INTER-BEAM MOBILITY CONTROL IN MIMO COMMUNICATION SYSTEMS

(71) Applicant: Intel IP Corporation, Santa Clara, CA (US)

(72) Inventors: Yushu Zhang, Beijing (CN); Yuan Zhu, Beijing (CN); Gang Xiong, Portland, OR (US); Jong-Kae Fwu, Sunnyvale, CA (US); Ralf Bendlin, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/747,027

(22) PCT Filed: Dec. 22, 2015

(86) PCT No.: PCT/US2015/067290
§ 371 (c)(1),
(2) Date: Jan. 23, 2018

(87) PCT Pub. No.: WO2017/034607
PCT Pub. Date: Mar. 2, 2017

(65) Prior Publication Data
US 2019/0013857 A1 Jan. 10, 2019

(30) Foreign Application Priority Data
Aug. 27, 2015 (WO) ............... PCT/CN2015/088210

(51) Int. Cl.
*H04B 7/06* (2006.01)
*H04W 76/27* (2018.01)
(Continued)

(52) U.S. Cl.
CPC ......... *H04B 7/0695* (2013.01); *H04B 7/0617* (2013.01); *H04B 7/0626* (2013.01);
(Continued)

(58) Field of Classification Search
CPC combination set(s) only.
See application file for complete search history.

(56) References Cited

U.S. PATENT DOCUMENTS

2013/0286960 A1* 10/2013 Li .................. H04W 72/042
370/329
2016/0219570 A1* 7/2016 Guo .................... H04L 5/0048
(Continued)

FOREIGN PATENT DOCUMENTS

| CN | 107852212 A | 3/2018 |
| WO | 2014/139174 A1 | 9/2014 |
| WO | 2017/034607 A1 | 3/2017 |

OTHER PUBLICATIONS

International Search Report and Written Opinion received for International Application No. PCT/US2015/067290, dated Jun. 1, 2016, 9 pages.

*Primary Examiner* — Yee F Lam
(74) *Attorney, Agent, or Firm* — Jaffery, Watson, Mendonsa & Hamilton LLP

(57) ABSTRACT

Apparatus, systems, and methods to implement inter-beam mobility control in MIMO communication systems are described. In one example, apparatus of an evolved Node B (eNB) comprises circuitry to configure a periodic transmit (TX) beamforming process for a user equipment (UE), wherein a plurality of different TX beams are used in a plurality of different beamforming reference signals (BRS), receive, from the UE, a selected TX beam index which identifies a selected TX beam, and schedule subsequent transmissions to the UE on the selected TX beam. Other examples are also disclosed and claimed.

16 Claims, 11 Drawing Sheets

(51) Int. Cl.
*H04W 74/04* (2009.01)
*H04L 5/00* (2006.01)
(52) U.S. Cl.
CPC ........... *H04L 5/0048* (2013.01); *H04W 74/04* (2013.01); *H04W 76/27* (2018.02)

(56) References Cited

U.S. PATENT DOCUMENTS

| | | | |
|---|---|---|---|
| 2016/0278117 A1* | 9/2016 | Sahlin | H04B 7/2615 |
| 2016/0337056 A1* | 11/2016 | Frenne | H04B 7/0695 |
| 2016/0366687 A1* | 12/2016 | Guo | H04L 1/1812 |
| 2017/0195998 A1* | 7/2017 | Zhang | H04B 7/086 |
| 2017/0207843 A1* | 7/2017 | Jung | H04B 7/0408 |
| 2018/0049055 A1* | 2/2018 | Wiberg | H04B 7/0695 |
| 2018/0263004 A1* | 9/2018 | Andersson | H04L 5/0007 |

* cited by examiner

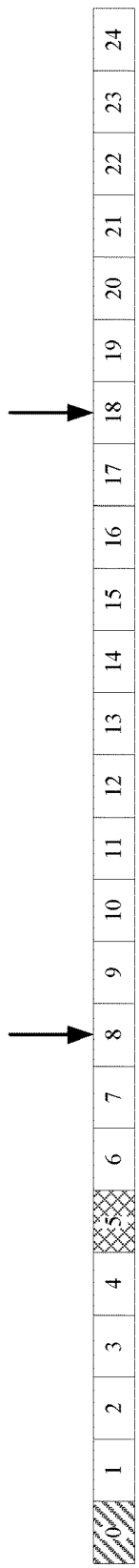
FIG. 3
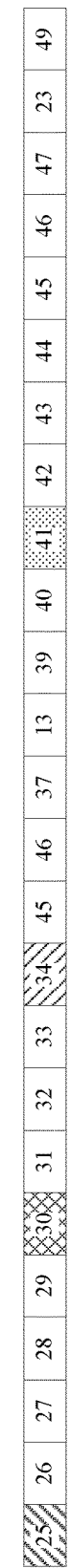 
FIG. 4

INTER-BEAM MOBILITY CONTROL IN MIMO COMMUNICATION SYSTEMS

RELATED APPLICATIONS

The present application claims priority under 35 U.S.C. § 371 to International Application No. PCT/US2015/067290 filed Dec. 22, 2015, entitled INTER-BEAM MOBILITY CONTROL IN MIMO COMMUNICATION SYSTEMS which in turn claims priority under 35 U.S.C. 365(b) to International Application No. PCT/CN2015/088210 filed Aug. 27, 2015. Said Application No. PCT/CN2015/088210 and PCT/US2015/067290 are hereby incorporated herein by reference in their entirety.

FIELD

The present disclosure generally relates to the field of electronic communication. More particularly, aspects generally relate to inter-beam mobility control in multiple input-multiple output (MIMO) communication systems.

BACKGROUND

Techniques to enable inter-beam mobility control in MIMO communication systems may find utility, e.g., in electronic communication systems for electronic devices.

BRIEF DESCRIPTION OF THE DRAWINGS

The detailed description is provided with reference to the accompanying figures. The use of the same reference numbers in different figures indicates similar or identical items.

FIG. 3 is a schematic illustration of a physical downlink control channel (PDCCH) which may be used to implement inter-beam mobility control in MIMO communication systems in accordance with various examples discussed herein.

FIGS. 4-7 are diagrams illustrating channel state information (CSI) processes which may be used to implement techniques for inter-beam mobility control in MIMO communication systems in accordance with various examples discussed herein.

Figure 1:
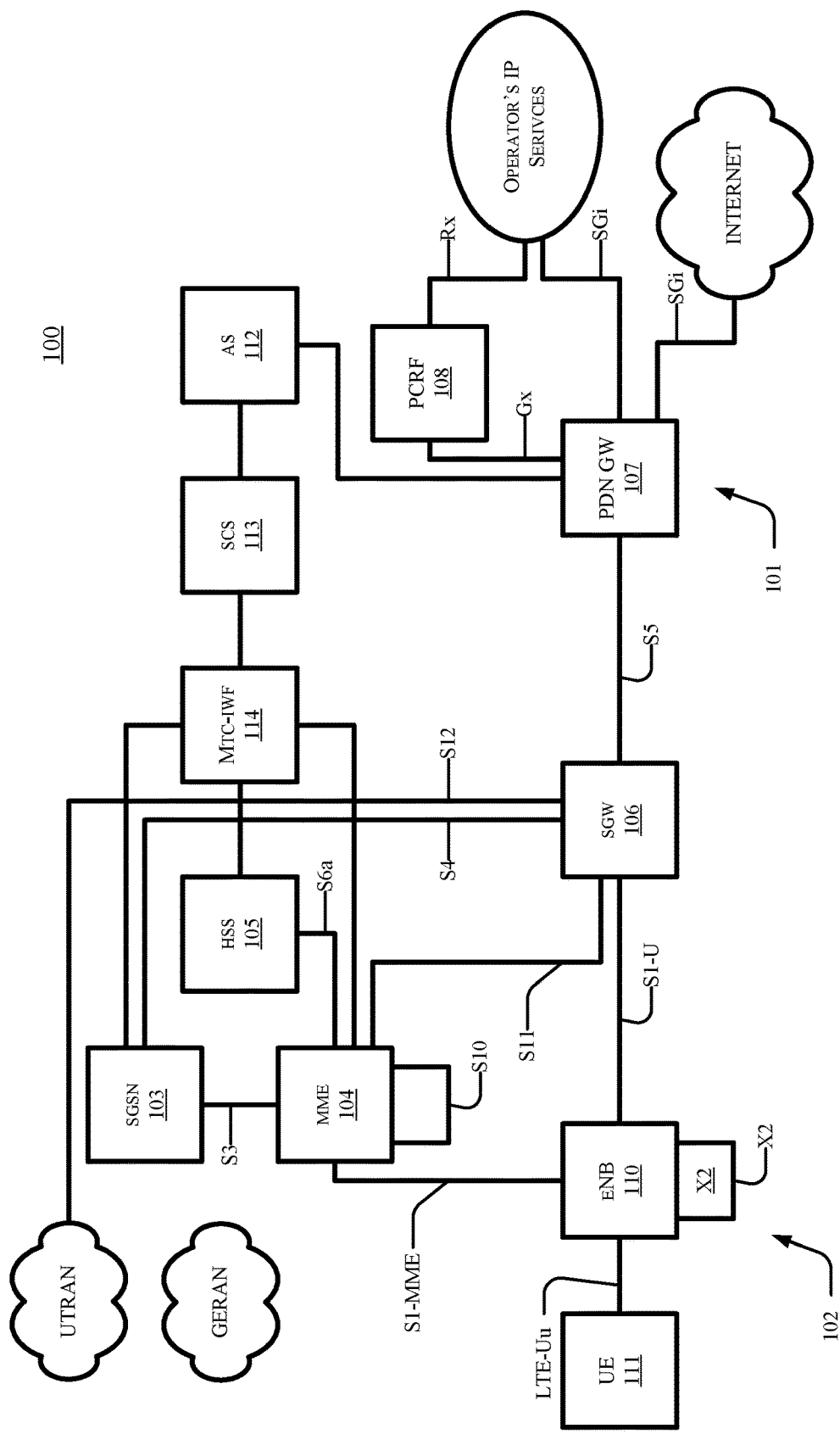
FIG. 1 is a schematic, block diagram illustration of components in a 3GPP LTE network which may be used to implement techniques for inter-beam mobility control in MIMO communication systems in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

Features and characteristics of techniques to implement inter-beam mobility control in MIMO communication systems in which the techniques may be incorporated are described below with reference to FIGS. 1-13.

FIG. 1 shows an exemplary block diagram of the overall architecture of a 3GPP LTE network 100 that includes one or more devices that are capable of implementing methods for inter-beam mobility control in MIMO communication systems according to the subject matter disclosed herein. FIG. 1 also generally shows exemplary network elements and exemplary standardized interfaces. At a high level, network 100 comprises a core network (CN) 101 (also referred to as an evolved Packet System (EPC)), and an air-interface access network E UTRAN 102. CN 101 is responsible for the overall control of the various User Equipment (UE) connected to the network and establishment of the bearers. CN 101 may include functional entities, such as a home agent and/or an ANDSF server or entity, although not explicitly depicted. E UTRAN 102 is responsible for all radio-related functions.

The main exemplary logical nodes of CN 101 include, but are not limited to, a Serving GPRS Support Node 103, the Mobility Management Entity 104, a Home Subscriber Server (HSS) 105, a Serving Gate (SGW) 106, a PDN Gateway 107 and a Policy and Charging Rules Function (PCRF) Manager 108. The functionality of each of the network elements of CN 101 is well known and is not described herein. Each of the network elements of CN 101 are interconnected by well-known exemplary standardized interfaces, some of which are indicated in FIG. 1, such as interfaces S3, S4, S5, etc., although not described herein.

While CN 101 includes many logical nodes, the E UTRAN access network 102 is formed by at least one node, such as evolved NodeB (base station (BS), eNB or eNodeB) 110, which connects to one or more User Equipment (UE) 111, of which only one is depicted in FIG. 1A. UE 111 is also referred to herein as a wireless device (WD) and/or a subscriber station (SS), and can include an M2M-type device. In one example, UE 111 may be coupled to eNB by an LTE-Uu interface. In one exemplary configuration, a single cell of an E UTRAN access network 102 provides one substantially localized geographical transmission point (having multiple antenna devices) that provides access to one or more UEs. In another exemplary configuration, a single cell of an E UTRAN access network 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an Si interface. More specifically, an eNB is connected to MME 104 by an Si MME interface and to SGW 106 by an Si U interface. The protocols that run between the eNBs and the UEs are generally referred to as the "AS protocols." Details of the various interfaces are well known and not described herein.

The eNB 110 hosts the PHYsical (PHY), Medium Access Control (MAC), Radio Link Control (RLC), and Packet Data Control Protocol (PDCP) layers, which are not shown in FIG. 1, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

By way of overview, in massive MIMO communication systems, the eNB may have several transmission (TX) beams for antenna virtualization. Meanwhile the UE may have more than one receiving (RX) beams to decode the downlink signals. Different TX beams may have different best RX beams.

The eNodeB may transmit a set of beamformed reference signals (BRSs) periodically, and each BRS may use different TX beams. The UE may measure and report a signal characteristic such as the BRS Receiving Power (BRS-RP) for some or all of the BRSs transmitted from the eNB. The UE may select one or more suitable transmission beams, e.g., the best TX beam. The UE may report the suitable beam(s) to the eNB, which may then use the selected beam for transmission to the UE.

The BRS-RP can be a key factor for the beam switching. As a result of UE mobility, the reported BRS-RP may change. Then a larger BRS-RP from another BRS (it may use a different TX beam) may be reported, which may result in beam switching by the eNB.

By way of example, the best TX-RX beam index pair is shown in Table 1. Given current eNB TX beam index is 1, then the UE RX beam 2 may be used for receiving. If the channel varies, the eNB TX beam 2 may turn to be the new TX beam, the UE RX beam may need to change from 2 into 3. Hence when eNB TX beam for one UE changes, the UE RX beam may need to change.

Then how to manage the inter-beam mobility becomes a problem.

TABLE 1

An Example of TX-RX Beam Index Pairs

| eNB TX Beam Index | UE RX Beam Index |
| --- | --- |
| 1 | 2 |
| 2 | 3 |
| ... | ... |
| N − 1 | 2 |
| N | 4 |

Further, a UE may have one or more omni-directional (omni-RX) antennas and one or more directional antennas. Under certain scenarios in which the UE locates at the cell center with more than one strong channel clusters, the UE omni-RX may be used for some eNB TX beams and higher MIMO layers may be achieved under omni-RX. Accordingly, techniques to manage a beam-switch between RX beams and Omni-RX becomes may find utility.

Subject matter described herein addresses these and other issues by providing techniques to manage inter-beam mobility and techniques for beam-switching between omni-RX and RX beamforming. In some examples an eNB may maintain a set of TX beams and transmit the BRS using these TX beams. The UE may report the BRS-RP for all or some of the BRSs. The eNB TX beam associated with the BRS with largest BRS-RP may be selected as the best eNB TX beam for the specific UE. For UE with RX beamforming, the best corresponding UE RX beam may be also selected.

Two types of inter-beam beam-switch events can be triggered by a UE based on the UE's BRS-RP measurements. In a type 1 event a larger BRS-RP for a new eNB TX beam may be measured and reported by UE based on the same UE RX beam. In a type 2 event a larger BRS-RP for a new eNB TX beam is measured and reported by UE based on a new UE RX beam.

Figure 2:
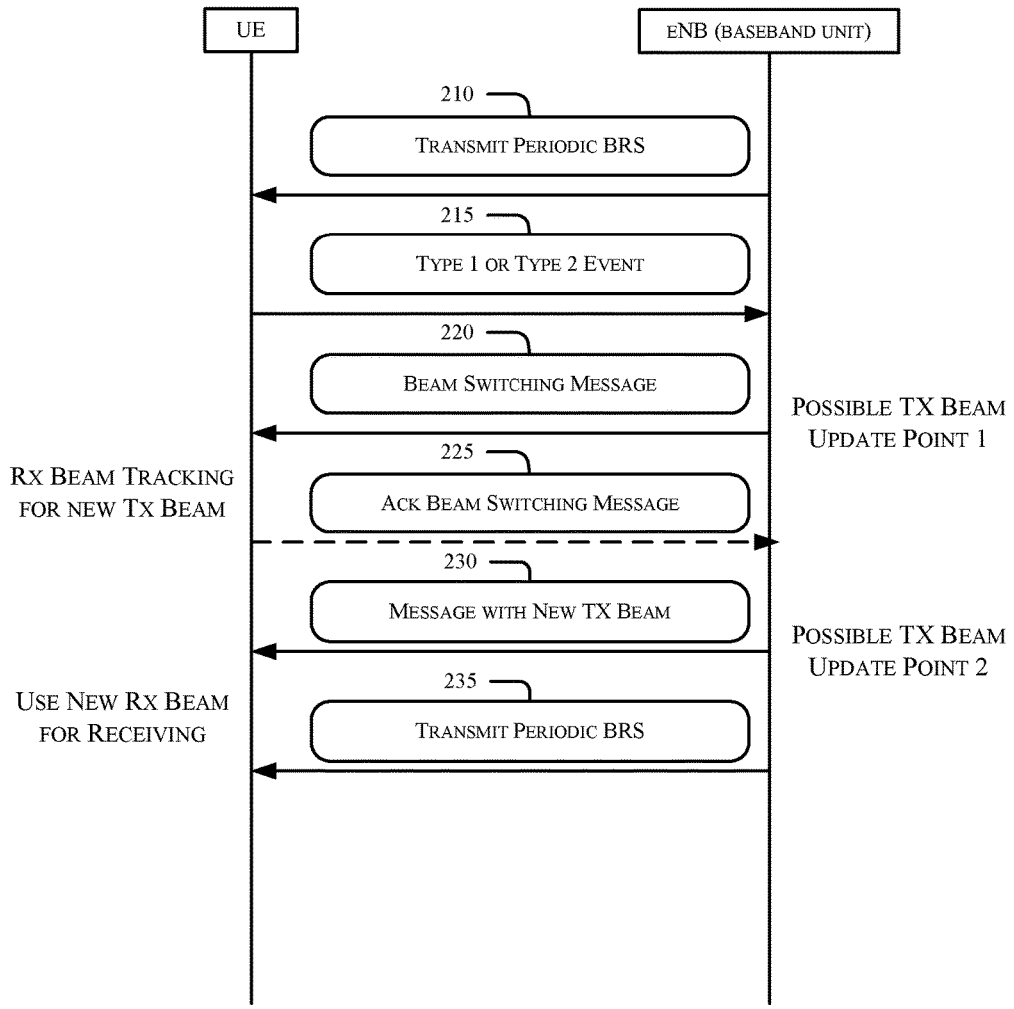
FIG. 2 is a flow diagram illustrating operations in a method to implement inter-beam mobility control in MIMO communication systems in accordance with various examples discussed herein.

FIG. 2 is a flow diagram illustrating operations in a method to implement inter-beam mobility control in MIMO communication systems in accordance with various examples discussed herein Referring to FIG. 2, at operation 210 an eNB may transmit a periodic BR. A UE receives the BRS and measures one or more signal strength parameters associated with the BRS. When a type 1 event or a type 2 event is detected by the UE the UE notifies the eNB of the event, e.g., via radio resource control (RRC) signaling. At operation 220 the eNB transmits a beam switching message to the UE which indicates this is a possible transmission beam update point. In response, the UE performs a RX beam tracking process for a new TX beam from the eNB and replies with an ACK to the beam switch message (operation 225) which may include a beam index or a BRS identifier associated with the best TX beam from the eNB. At operation 230 the eNB transmits a message with a new TX beam, which the UE uses for receiving. After a predetermined period of time the eNB may transmit another periodic BRS (operation 235).

In Type 1 inter-beam mobility management, the UE may not update the RX beam until it is indicated to receive the downlink signals in a new TX beam. In some examples, the new eNB TX beam index may be configured with a RRC signaling or medium access control (MAC) Control Element (CE). The new eNB TX beam index may not be used until the acknowledge (ACK) of this transmission. In another example, the eNB may use a preamble index to indicate the new TX beam index, which may be configured by a non-contention based physical random access channel (PRACH) triggered RRC signaling or the downlink control information (DCI).

In another example, the new eNB TX beam index may be transmitted implicitly by 5G physical downlink control channel (xPDCCH). The UE may be configured with a measured neighbor TX beams set, and the size of this set may be $N_{rx}^{beam}{}_{list}$.

For example, one candidate beam set contains up to K (e.g., K=4) spatial correlated candidate beams and the corresponding CSI-RS symbols are transmitted in one OFDM symbol because the spatially correlated candidate beams can be received by spatially correlated Rx beams. eNB can create candidate beam set based on its own knowledge about spatial correlation among all its Tx beams and the reported BRS-RP from UE. When eNB schedules UE with dynamic channel state information reference signal (CSI-RS) resource to measure CSI, the eNB may describe the quasi-collocation signaling between one CSI-RS group (e.g., one or two ports CSI-RS which correspond to one beam) and one BRS port in order for the UE to apply to the correct Rx beam.

When decoding one xPDCCH set (which corresponds to one candidate beam set), the scrambling sequence of xPDCCH UE-specific Reference Signal (UERS) may be initialized by the active beam index. The UE would need to blindly test all four scrambling sequences corresponding to the candidate beams within one CSI-RS group. This allows inter-beam mobility within one candidate beam set to become seamless. Since the optimum RX beam for each TX beam in one candidate beam set is spatially correlated, and sometimes identical, beam change within the candidate beam set will not break the link and it also allows UE to update optimum Rx beam after detecting TX beam change.

For example, for the generation of UERS associated with xPDCCH, a pseudo-random sequence generator may be initialized as follows:

$$c_{init} = \left(\left[\frac{n_s}{2}\right] + 1\right)(2n_{ID,i}^{EPDCCH} + 1) \times 2^{16} + n_{ID}^{beam} \times 2^8 + n_{SCID}^{EPDCCH}$$

Where $n_s$ indicates the number of slot; $n_{ID,i}^{EPDCCH}$ is an xPDCCH set specific ID; $n_{SCID}^{EPDCCH}$ is the scramble ID for xPDCCH; and $n_{ID}^{beam}$ represents the new TX beam index in one TX beams set.

Alternatively the scramble sequence may be initialized as follows:

$$c_{init} = \left(\left[\frac{n_s}{2}\right] + 1\right)(2n_{ID}^{beam} + 1) \times 2^{16} + n_{SCID}^{EPDCCH}$$

where xPDCCH is sent from the best beam using beam specific scrambling sequence.

In another example, the new TX beam index may be implicitly indicated in the UE specific search space. In one example, the TX beam index is associated with one or more xPDCCH candidates. The search space may be divided into multiple sub-search spaces, and each sub-search space may be associated with the new TX beam index.

In another example, the search space can be defined as a function of the new TX beam. In the existing LTE specification, the hashing table for UE specific search space is generated according to the following equation, $$Y_{p,k} = (A_p + Y_{p,k-1}) \bmod D$$

Where $Y_{p,-1}$ can be defined as:

$$Y_{p,-1} = n_{RNTI} + n_{ID}^{beam}$$

Here $n_{RNTI}$ is the Cell Radio Network Temporary Identifier (C-RNTI).

In another example, the CRC of the xPDCCH transmission can be scrambled by the new TX beam index. In particular, for the xPDCCH with UE specific search space, the CRC can be scrambled by a function of C-RNTI and the new TX beam index. In an example, a 18 bit CRC sequence may be used, in which the lower 16 bits may be the C-RNTI and the higher 2 bits may be determined by the new TX beam index.

In another embodiment of this invention, the new TX beam index may be indicated via downlink assignment. An N-bit indicator may be used in the downlink assignment, where:

$$N = \log_2 N_{rx}^{beam}{}_{list}$$

and $N_{rx}^{beam}{}_{list}$ is the total number of TX beams, which may be configured via RRC signaling or a fixed value in the whole communication system. Alternatively, the neighbor TX beam may be configured via RRC signaling, then:

$$N = \log_2 N_{rx}^{beam}{}_{list}$$

where $N_{rx}^{beam}{}_{list}$ is the number of neighbor TX beam list.

FIG. 3 is a schematic illustration of a physical downlink control channel (PDCCH) which may be used to implement inter-beam mobility control in MIMO communication systems in accordance with various examples discussed herein. Referring to FIG. 3, in subframe 8, the xPDCCH for UE 1 indicates a new beam index, and the UE 1 may receive the xPDCCH with new beam if the downlink assignment in subframe 8 is correctly decoded.

In Type 2 inter-beam mobility management, a typical new RX beam may be the Omni-RX, which may bring in higher MIMO layers. For users proximate a center of a cell commonly have relatively high BRS-RP, so they may select Omni-RX instead of RX beamforming. However, when the UE switches to Omni-RX from RX beamforming, the best TX beam index may change.

In another example, there may be two kinds of BRS-RPs: a first BRS-RP ($\gamma_{beam}$) which is measured under current RX beam and a second BRS-RP ($\gamma_{beam}$) which is measured under a new RX beam. The UE may measure and report the first and second BRS-RPs to the eNB. In the event that $\gamma'_{beam} > \gamma_{beam}$ a new receiving method may be indicated by RRC signaling.

In some examples the type 2 inter-beam handover may be performed using techniques similar to those applied to execute type 1 handovers. In other examples, the beam switching operation between RX beamforming and omni-RX may be done in the physical layer. The UE may be configured with two types of CSI processes: a first for RX beamforming based CSI and a second for omni-RX based CSI.

FIG. 4 illustrates an example of a CSI process method for inter-beam handover. Referring to FIG. 4, in some examples the indicator for receiving method handover may be added in downlink assignment, which means the receiving method should be used after a number (g) subframes, where g may represent the roundtrip delay or decoding delay. Further, g may be predefined in a specification or configured by higher layers via 5G master information block (xMIB), 5G system information block (xSIB) or dedicated RRC signalling.

Figure 5:
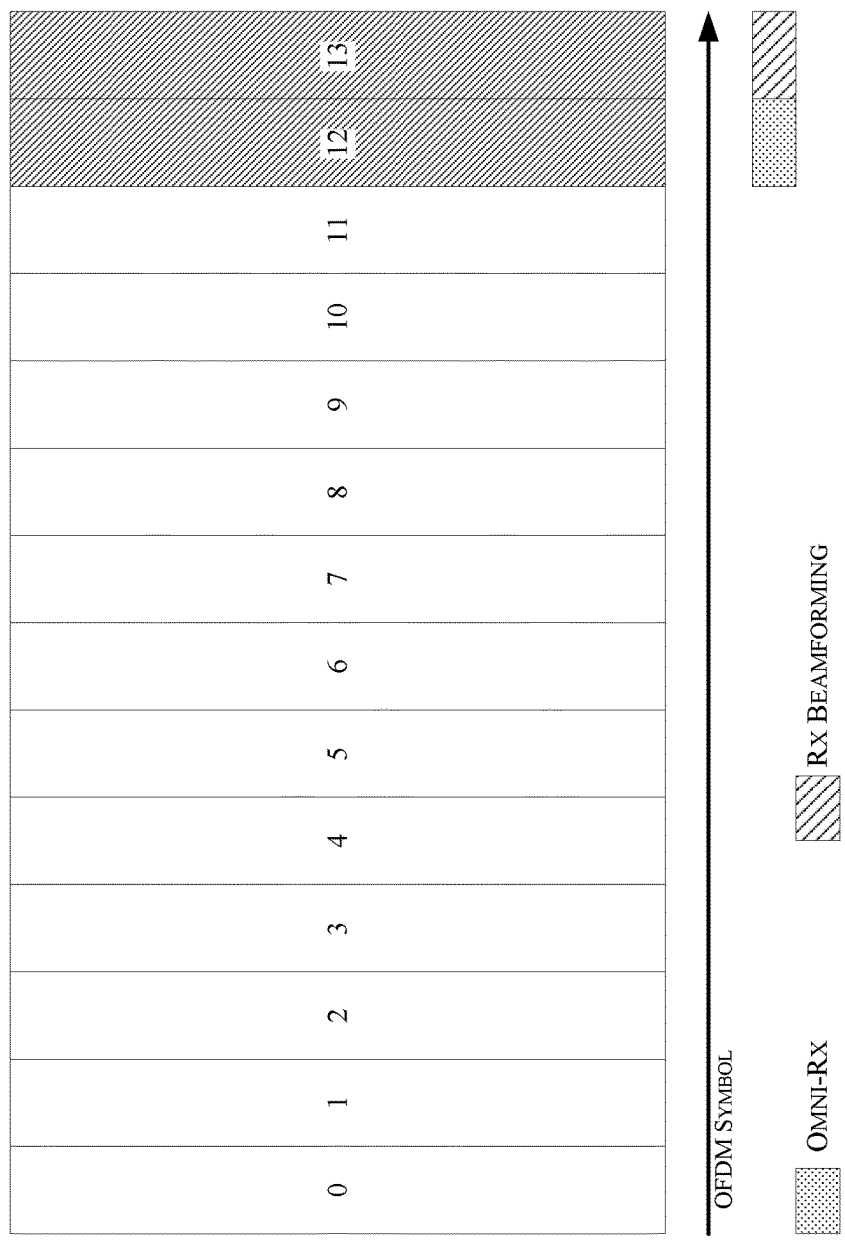

In another example, the UE may maintain the receiving method. The UE may measure the different symbols of the CSI based RX beamforming and Omni-RX as shown in FIG. 5. The TX beams for the two symbols may be the same, and the UE may report the best CQI and select the receiving method based on this CQI. If the TX beams in the two symbols are different, the receiving method may be used alternately in different subframes within a CSI process. Whether the TX beams in two CSI subframes are the same may be indicated via RRC signaling or in the downlink assignment with cross-subframe scheduling.

Figure 6:
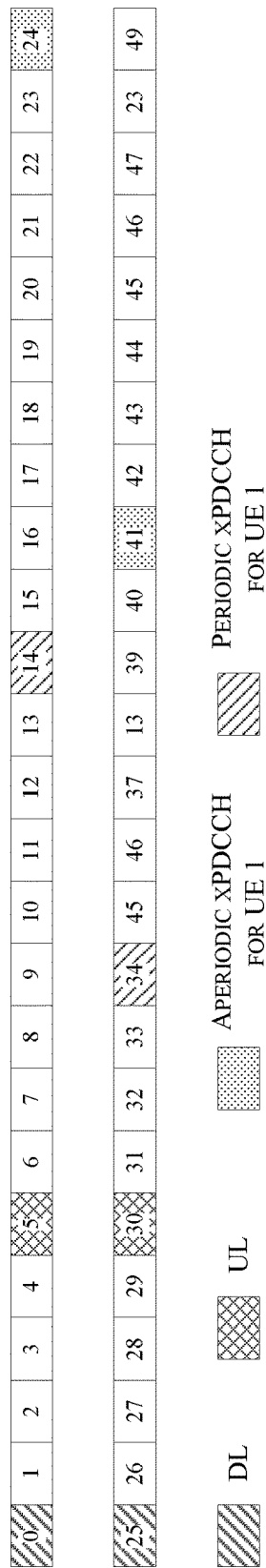

Referring to FIG. 6, In another example, a UE may be configured with a periodic xPDCCH and/or PDSCH. The period and offset may be configured via RRC signaling or Random Access Response (RAR). The xPDCCH may contain the new TX beam index and a bit map for uplink indicator for the next consecutive subframes, in which bit "1" means this subframe is indicated as an uplink subframe. Then the UE may not decode xPDCCH in those subframes so that it may save power. If the periodic xPDCCH is collided with an uplink subframe, it may not transmit. A UE may have both periodic xPDCCH and aperiodic xPDCCH.

In another example, there may be a fixed downlink subframe for PSS and BRS transmission, so that it is not necessary to reserve a TDD guard band for the last subframe. For example, if subframe 25 is fixed to transmit PSS and BRS, then for subframe 24, it does not need to reserve the TDD guard band. Then the eNB may transmit the BRS with new TX beam in this TDD guard band periodically. The period and resource blocks of this BRS for each UE may be configured via RRC signaling.

Figure 7:
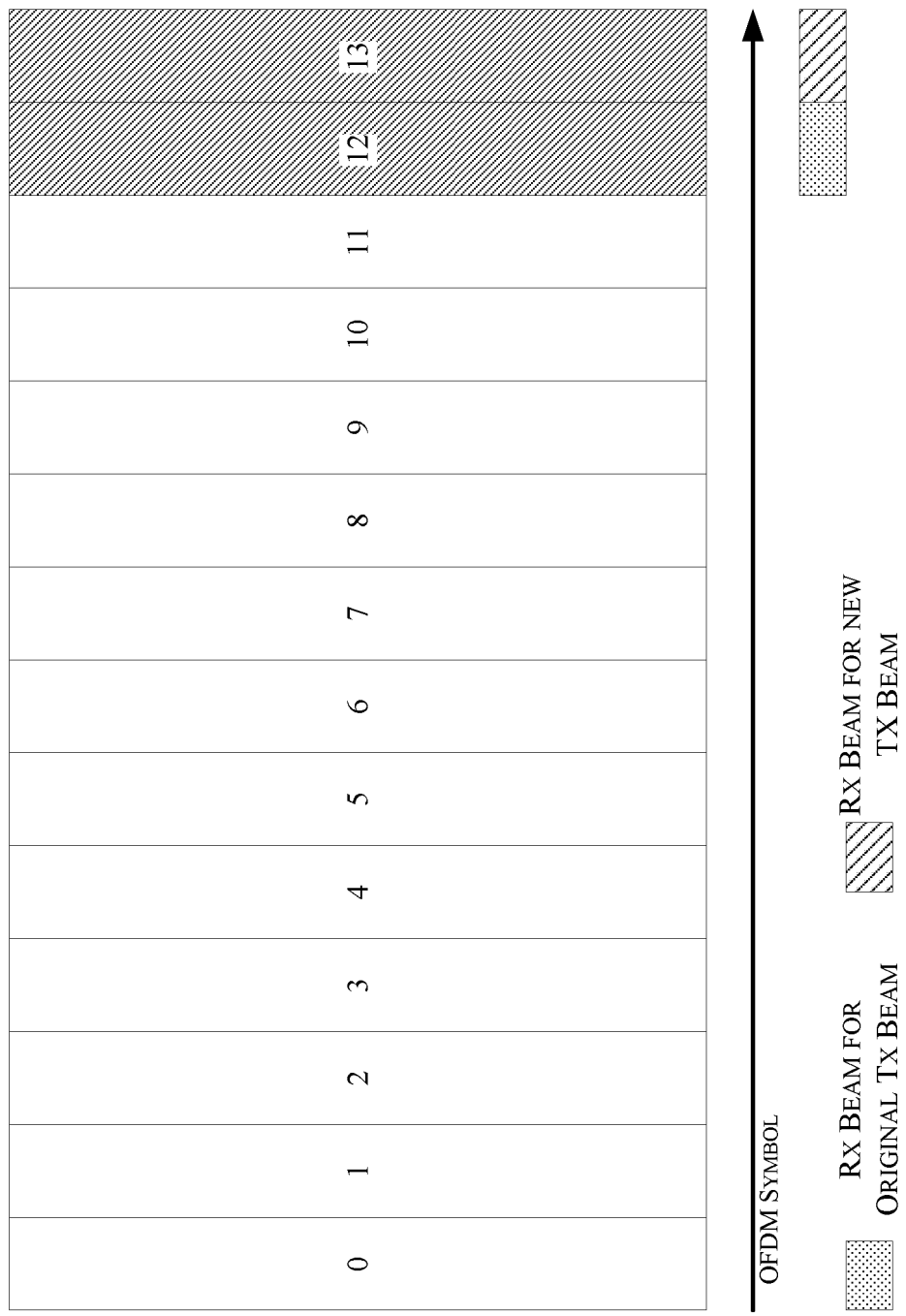

An example is shown as FIG. 7. Referring to FIG. 7, the UE may maintain two TX beams groups, which may be received by different RX beams. Then the UE may use two RX beams to detect the two BRSs. The beam with the best BRS-RP may be considered as the TX beam index for subsequent transmissions. For the other OFDM symbols (symbol 0 to 11), they may be applied to uplink or downlink transmission.

To indicate an inter-beam handover, the eNodeB may use the same TX beam in the two symbols. Then the UE may get the new TX beam index and its best RX beam after measuring the BRS-RP. Alternatively these measurement subframes may be common for all UEs. A 1-bit indicator may be used in the Downlink Control Information (DCI) to indicate whether the UE needs to measure the BRS in the last symbols or the resource index may be added to indicate the resource for the BRS to measure, where resource index 0 may indicate there is no need to measure BRS for this subframe.

Figure 8:
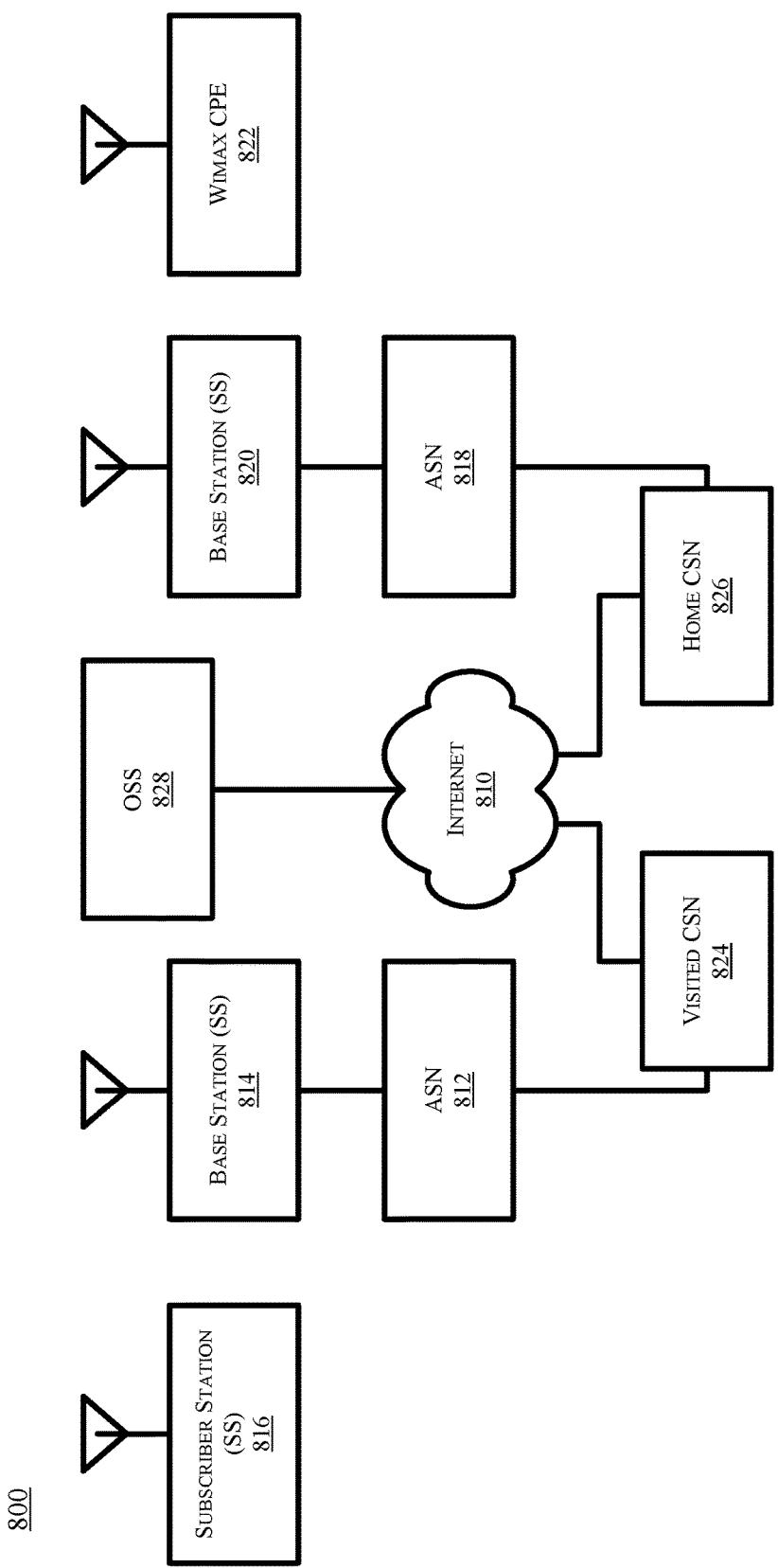
FIG. 8 is a schematic, block diagram illustration of a wireless network in accordance with one or more exemplary embodiments disclosed herein.

FIG. 8 is a schematic, block diagram illustration of a wireless network 800 in accordance with one or more exemplary embodiments disclosed herein. One or more of the elements of wireless network 800 may be capable of implementing methods to identify victims and aggressors according to the subject matter disclosed herein. As shown in FIG. 8, network 800 may be an Internet-Protocol-type (IP-type) network comprising an Internet-type network 810, or the like, that is capable of supporting mobile wireless access and/or fixed wireless access to Internet 810.

In one or more examples, network 800 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative examples, network 800 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 800 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects.

As an example of mobile wireless access, access service network (ASN) 812 is capable of coupling with base station (BS) 814 to provide wireless communication between subscriber station (SS) 816 (also referred to herein as a wireless terminal) and Internet 810. In one example, subscriber station 816 may comprise a mobile-type device or information-handling system capable of wirelessly communicating via network 800, for example, a notebook-type computer, a cellular telephone, a personal digital assistant, an M2M-type device, or the like. In another example, subscriber station is capable of providing an uplink-transmit-power control technique that reduces interference experienced at other wireless devices according to the subject matter disclosed herein.

ASN 812 may implement profiles that are capable of defining the mapping of network functions to one or more physical entities on network 800. Base station 814 may comprise radio equipment to provide radio-frequency (RF) communication with subscriber station 816, and may comprise, for example, the physical layer (PHY) and media access control (MAC) layer equipment in compliance with an IEEE 802.16e-type standard. Base station 814 may further comprise an IP backplane to couple to Internet 810 via ASN 812, although the scope of the claimed subject matter is not limited in these respects.

Network 800 may further comprise a visited connectivity service network (CSN) 824 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 826, and the scope of the claimed subject matter is not limited in these respects.

Visited CSN 824 may be referred to as a visited CSN in the case, for example, in which visited CSN 824 is not part of the regular service provider of subscriber station 816, for example, in which subscriber station 816 is roaming away from its home CSN, such as home CSN 826, or, for example, in which network 800 is part of the regular service provider of subscriber station, but in which network 800 may be in another location or state that is not the main or home location of subscriber station 816.

In a fixed wireless arrangement, WiMAX-type customer premises equipment (CPE) 822 may be located in a home or business to provide home or business customer broadband access to Internet 810 via base station 820, ASN 818, and home CSN 826 in a manner similar to access by subscriber station 816 via base station 814, ASN 812, and visited CSN 824, a difference being that WiMAX CPE 822 is generally disposed in a stationary location, although it may be moved to different locations as needed, whereas subscriber station may be utilized at one or more locations if subscriber station 816 is within range of base station 814 for example.

It should be noted that CPE 822 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 822 is capable of providing an uplink-transmit-power control technique that reduces interference experienced at other wireless devices according to the subject matter disclosed herein.

In accordance with one or more examples, operation support system (OSS) 828 may be part of network 800 to provide management functions for network 800 and to provide interfaces between functional entities of network 800. Network 800 of FIG. 8 is merely one type of wireless network showing a certain number of the components of network 800; however, the scope of the claimed subject matter is not limited in these respects.

Figure 9:
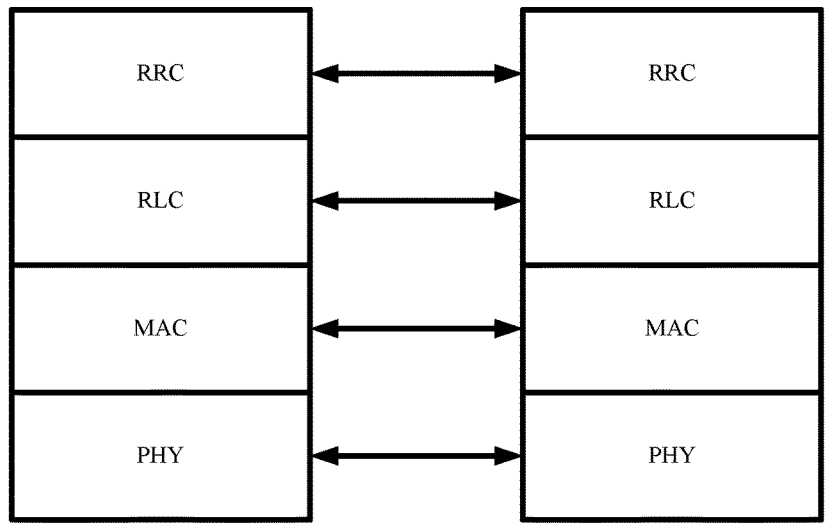
FIGS. 9 and 10 are schematic, block diagram illustrations, respectively, of radio interface protocol structures between a UE and an eNodeB based on a 3GPP-type radio access network standard in accordance with one or more exemplary embodiments disclosed herein.
Figure 10:
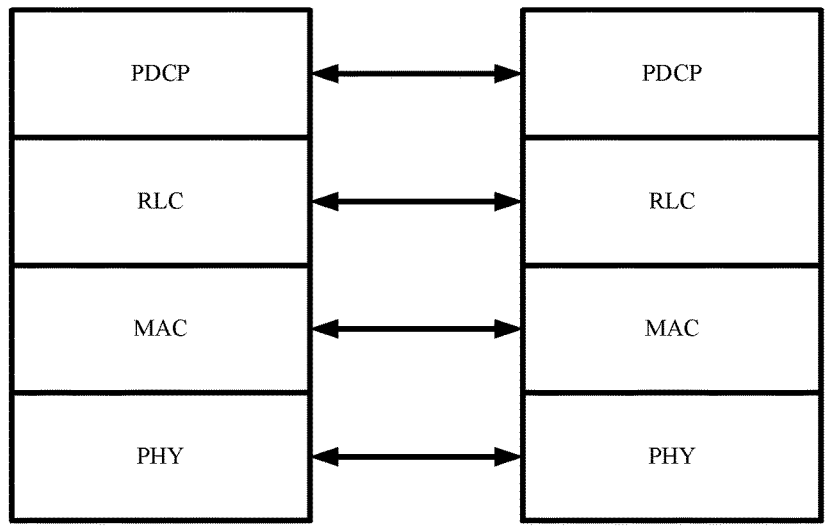

FIGS. 9 and 10 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 9 depicts individual layers of a radio protocol control plane and FIG. 10 depicts individual layers of a radio protocol user plane. The protocol layers of FIGS. 9 and 10 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 11:
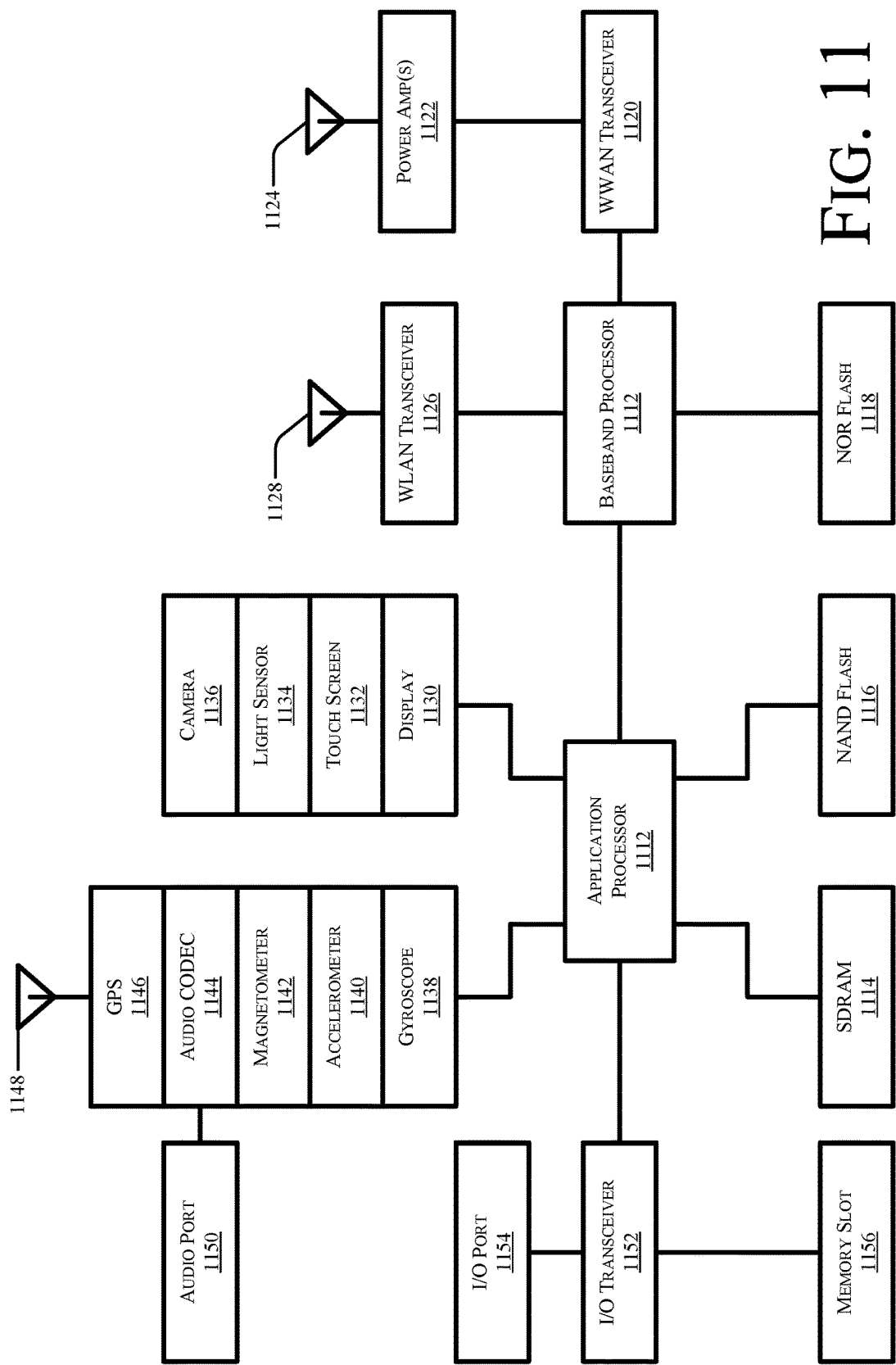
FIG. 11 is a schematic, block diagram illustration of an information-handling system in accordance with one or more exemplary embodiments disclosed herein.

FIG. 11 depicts an exemplary functional block diagram of an information-handling system 1100 that is capable of implementing methods to identify victims and aggressors according to the subject matter disclosed herein. Information handling system 1100 of FIG. 11 may tangibly embody one or more of any of the exemplary devices, exemplary network elements and/or functional entities of the network as shown in and described herein. In one example, information-handling system 1100 may represent the components of a UE 111 or eNB 110, and/or a WLAN access point 120, with greater or fewer components depending on the hardware specifications of the particular device or network element. In another example, information-handling system may provide M2M-type device capability. In yet another exemplary embodiment, information-handling system 1100 is capable of providing an uplink-transmit-power control technique that reduces interference experienced at other wireless devices according to the subject matter disclosed herein. Although information-handling system 1100 represents one example of several types of computing platforms, information-handling system 1100 may include more or fewer elements and/or different arrangements of elements than shown in FIG. 11, and the scope of the claimed subject matter is not limited in these respects.

In one or more examples, information-handling system 1100 may comprise one or more applications processor 1110 and a baseband processor 1112. Applications processor 1110 may be utilized as a general purpose processor to run applications and the various subsystems for information handling system 1100, and to capable of providing an uplink-transmit-power control technique that reduces interference experienced at other wireless devices according to the subject matter disclosed herein. Applications processor 1110 may include a single core or alternatively may include multiple processing cores wherein one or more of the cores may comprise a digital signal processor or digital signal processing core. Furthermore, applications processor 1110 may include a graphics processor or coprocessor disposed on the same chip, or alternatively a graphics processor coupled to applications processor 1110 may comprise a separate, discrete graphics chip. Applications processor 1110 may include on-board memory, such as cache memory, and further may be coupled to external memory devices such as synchronous dynamic random access memory (SDRAM) 1114 for storing and/or executing applications, such as capable of providing an uplink-transmit-power control technique that reduces interference experienced at other wireless devices according to the subject matter disclosed herein. During operation, and NAND flash 1116 for storing applications and/or data even when information handling system 1100 is powered off.

In one example, a list of candidate nodes may be stored in SDRAM 1114 and/or NAND flash 1116. Further, applications processor 1110 may execute computer-readable instructions stored in SDRAM 1114 and/or NAND flash 1116 that result in an uplink-transmit-power control technique that reduces interference experienced at other wireless devices according to the subject matter disclosed herein.

In one example, baseband processor 1112 may control the broadband radio functions for information-handling system 1100. Baseband processor 1112 may store code for controlling such broadband radio functions in a NOR flash 1118. Baseband processor 1112 controls a wireless wide area network (WWAN) transceiver 1120 which is used for modulating and/or demodulating broadband network signals, for example, for communicating via a 3GPP LTE network or the like as discussed herein with respect to FIG. 11. The WWAN transceiver 1120 couples to one or more power amplifiers 1122 that are respectively coupled to one or more antennas 1124 for sending and receiving radio-frequency signals via the WWAN broadband network. The baseband processor 1112 also may control a wireless local area network (WLAN) transceiver 1126 coupled to one or more suitable antennas 1128 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 1110 and baseband processor 1112, and the scope of the claimed subject matter is not limited in these respects. For example, any one or more of SDRAM 1114, NAND flash 1116 and/or NOR flash 1118 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1110 may drive a display 1130 for displaying various information or data, and may further receive touch input from a user via a touch screen 1132, for example, via a finger or a stylus. In one exemplary embodiment, screen 1132 display a menu and/or options to a user that are selectable via a finger and/or a stylus for entering information into information-handling system 1100.

An ambient light sensor 1134 may be utilized to detect an amount of ambient light in which information-handling system 1100 is operating, for example, to control a brightness or contrast value for display 1130 as a function of the intensity of ambient light detected by ambient light sensor 1134. One or more cameras 1136 may be utilized to capture images that are processed by applications processor 1110 and/or at least temporarily stored in NAND flash 1116. Furthermore, applications processor may be coupled to a gyroscope 1138, accelerometer 1140, magnetometer 1142, audio coder/decoder (CODEC) 1144, and/or global positioning system (GPS) controller 1146 coupled to an appropriate GPS antenna 1148, for detection of various environmental properties including location, movement, and/or orientation of information-handling system 1100. Alternatively, controller 1146 may comprise a Global Navigation Satellite System (GNSS) controller. Audio CODEC 1144 may be coupled to one or more audio ports 1150 to provide microphone input and speaker outputs either via internal devices and/or via external devices coupled to information-handling system via the audio ports 1150, for example, via a headphone and microphone jack. In addition, applications processor 1110 may couple to one or more input/output (I/O) transceivers 1152 to couple to one or more I/O ports 1154 such as a universal serial bus (USB) port, a high-definition multimedia interface (HDMI) port, a serial port, and so on. Furthermore, one or more of the I/O transceivers 1152 may couple to one or more memory slots 1156 for optional removable memory, such as secure digital (SD) card or a subscriber identity module (SIM) card, although the scope of the claimed subject matter is not limited in these respects.

Figure 12:
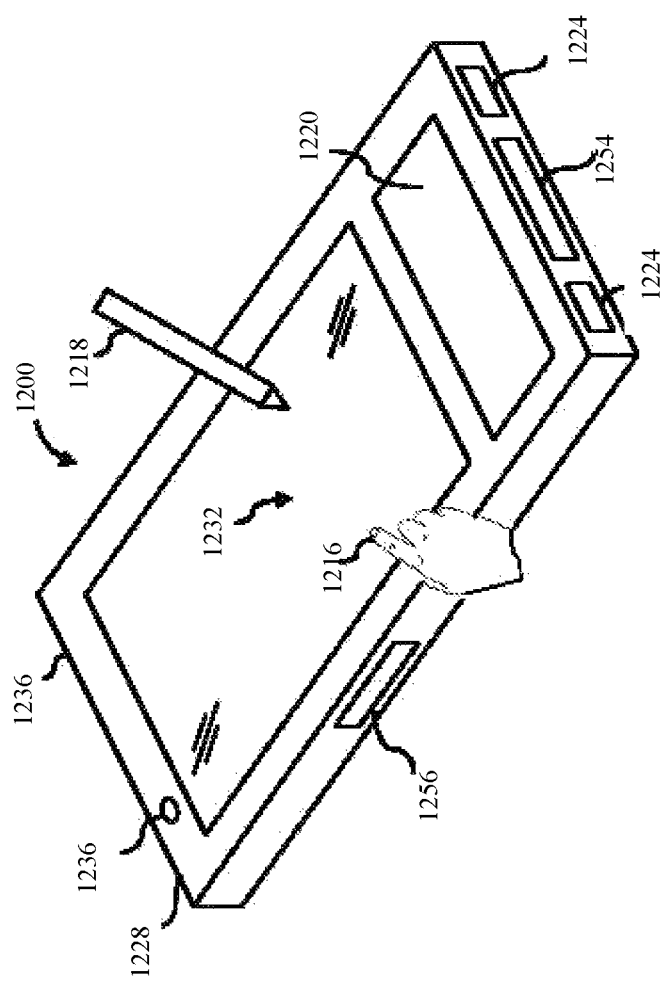
FIG. 12 is an isometric view of an exemplary embodiment of an information-handling system that optionally may include a touch screen in accordance with one or more embodiments disclosed herein.

FIG. 12 depicts an isometric view of an exemplary embodiment of the information-handling system of FIG. 11 that optionally may include a touch screen in accordance with one or more embodiments disclosed herein. FIG. 11 shows an example implementation of an information-handling system 1200 tangibly embodied as a cellular telephone, smartphone, smart-type device, or tablet-type device or the like, that is capable of implementing methods to identify victims and aggressors according to the subject matter disclosed herein. In one or more embodiments, the information-handling system a housing 1210 having a display 1230 that may include a touch screen 1232 for receiving tactile input control and commands via a finger 1216 of a user and/or a via stylus 1218 to control one or more applications processors 1110. The housing 1210 may house one or more components of information-handling system 1200, for example, one or more applications processors 1110, one or more of SDRAM 1114, NAND flash 1116, NOR flash 1118, baseband processor 1112, and/or WWAN transceiver 1120. The information-handling system 1200 further may optionally include a physical actuator area 1220 which may comprise a keyboard or buttons for controlling information-handling system 1200 via one or more buttons or switches. The information-handling system 1200 may also include a memory port or slot 1256 for receiving non-volatile memory, such as flash memory, for example, in the form of a secure digital (SD) card or a subscriber identity module (SIM) card. Optionally, the information-handling system 1200 may further include one or more speakers and/or microphones 1224 and a connection port 1254 for connecting the information-handling system 1200 to another electronic device, dock, display, battery charger, and so on. Additionally, information-handling system 1200 may include a headphone or speaker jack 1228 and one or more cameras 1236 on one or more sides of the housing 1210. It should be noted that the information-handling system 1200 of FIG. 12 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 13:
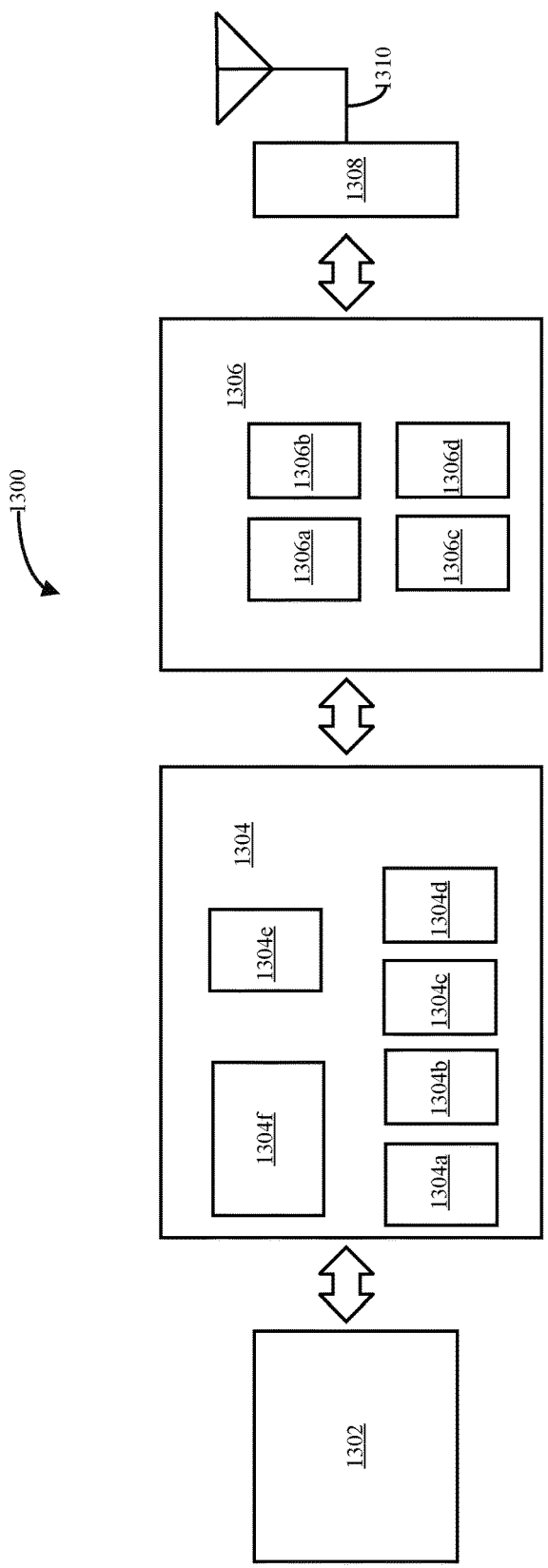
FIG. 13 is a schematic, block diagram illustration of components of a wireless device in accordance with one or more exemplary embodiments disclosed herein.

Embodiments described herein may be implemented into a system using any suitably configured hardware and/or software. FIG. 13 illustrates, for one embodiment, example components of a User Equipment (UE) device 1300. In some embodiments, the UE device 1300 may include application circuitry 1302, baseband circuitry 1304, Radio Frequency (RF) circuitry 1306, front-end module (FEM) circuitry 1308 and one or more antennas 1310, coupled together at least as shown.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304*a*, third generation (3G) baseband processor 1304*b*, fourth generation (4G) baseband processor 1304*c*, and/or other baseband processor(s) 1304*d* for other existing generations, generations in development or to be developed in the future (e.g., fifth generation (5G), 6G, etc.). The baseband circuitry 1304 (e.g., one or more of baseband processors 1304*a-d*) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304e of the baseband circuitry 1304 may be configured to run elements of the protocol stack for signaling of the PHY, MAC, RLC, PDCP and/or RRC layers. In some embodiments, the baseband circuitry may include one or more audio digital signal processor(s) (DSP) 1304f The audio DSP(s) 1304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include mixer circuitry 1306a, amplifier circuitry 1306b and filter circuitry 1306c. The transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c. The filter circuitry 1306c may include a low-pass filter (LPF), although the scope of the embodiments is not limited in this respect.

In some embodiments, the mixer circuitry 1306a of the receive signal path and the mixer circuitry 1306a of the transmit signal path may include two or more mixers and may be arranged for quadrature downconversion and/or upconversion respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and/or direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306*d* of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310.

In some embodiments, the UE device 1300 may include additional elements such as, for example, memory/storage, display, camera, sensor, and/or input/output (I/O) interface.

The following pertains to further examples.

Example 1 is an apparatus of an evolved Node B (eNB) comprising circuitry to configure a periodic transmit (TX) beamforming process for a user equipment (UE), wherein a plurality of different TX beams are used in a plurality of different beamforming reference signals (BRS), receive, from the UE, a selected TX beam index which identifies a selected TX beam, and schedule subsequent transmissions to the UE on the selected TX beam.

In Example 2, the subject matter of Example 1 can optionally include circuitry to schedule a non-contention based Physical Random Access Channel (PRACH) procedure with a scheduled preamble index, wherein the preamble index is to indicate the selected TX beam index.

In Example 3, the subject matter of any one of Examples 1-2 can optionally include circuitry to transmit the selected TX beam index implicitly based on a 5G Physical Downlink Control Channel (xPDCCH).

In Example 4, the subject matter of any one of Examples 1-3 can optionally include circuitry to configure the UE a neighbor TX beam index list via Radio Resource Control (RRC) signaling.

In Example 5, the subject matter of any one of Examples 1-4 can optionally include circuitry to maintain a neighbor TX beam index list, wherein the selected TX beam index may be included in the neighbor TX beam index list.

In Example 6, the subject matter of any one of Examples 1-5 can optionally include circuitry to generate a scramble sequence based on the selected TX beam index, wherein the scramble sequence is used to generate a UE-specific RS associated with the xPDCCH.

In Example 7, the subject matter of any one of Examples 1-6 can optionally include circuitry to generate a Cyclic Redundancy Check (CRC) code for the xPDCCH based on a Radio Network Temporary Identity (RNTI) and the selected TX beam index.

In Example 8, the subject matter of any one of Examples 1-7 can optionally include an arrangement in which the selected TX beam index is transmitted in a Downlink Control Information (DCI).

In Example 9, the subject matter of any one of Examples 1-8 can optionally include circuitry to schedule a first Channel State Information (CSI) process for a first RX beam measurement and a second CSI process for a second RX beam measurement.

In Example 10, the subject matter of any one of Examples 1-9 can optionally include circuitry to schedule a first Channel State Information (CSI) process for a first RX beam measurement and a second CSI process for a second RX beam measurement.

In Example 11, the subject matter of any one of Examples 1-10 can optionally include an arrangement in which a BRS is transmitted in a time division duplex (TDD) guard band in a subframe which precedes a fixed downlink subframe.

In Example 12, the subject matter of any one of Examples 1-11 can optionally include circuitry to configure the BRS resource via RRC signaling.

Example 13 is an apparatus of a user equipment (UE) comprising circuitry to receive a periodic transmit (TX) beamforming process from an evolved node B (eNB), wherein a plurality of different TX beams are used in a plurality of different beamforming reference signals (BRS), select a TX beam from the plurality of TX beams in the plurality of BRS and transmit a TX beam index which identifies a selected TX beam to the eNB and receive subsequent transmissions from the eNB on the selected TX beam.

In Example 14, the subject matter of Example 13 can optionally include circuitry to transmit the selected TX beam to the eNB via at least one of a radio resource control (RRC) signaling or a Medium Access Control (MAC) Control Element (CE).

In Example 15, the subject matter of any one of Examples 13-14 can optionally include circuitry to receive, from the eNB, a neighbor TX beam index list via Radio Resource Control (RRC) signaling.

In Example 16, the subject matter of any one of Examples 13-15 can optionally include circuitry to transmit, to the eNB, a signal indicating a BRS Receiving Power (BRS-RP) was received based on a new RX beam and receive, from the eNB, a selected measured TX beam index via RRC signaling.

In Example 17, the subject matter of any one of Examples 13-16 can optionally include circuitry to implement a first Channel State Information (CSI) process for a first RX beam measurement and a second CSI process for a second RX beam measurement.

In Example 18, the subject matter of any one of Examples 13-17 can optionally include circuitry to receive a first BRS-RP which is measured under a first RX beam and a second BRS-RP which is measured under a second RX beam, and determine whether the second BRS-RP is greater than the first BRS-RP, and in response to a determination that the second BRS-RP is greater than the first BRS-RP, to indicate a new receiving method by RRC signaling.

Example 19 is a machine-readable medium comprising instructions which, when executed by a processor in an apparatus of an evolved Node B (eNB), configure the processor to configure a periodic transmit (TX) beamforming process for a user equipment (UE), wherein a plurality of different TX beams are used in a plurality of different beamforming reference signals (BRS), receive, from the UE, a selected TX beam index which identifies a selected TX beam, and schedule subsequent transmissions to the UE on the selected TX beam.

In Example 20, the subject matter of Example 19 can optionally include instructions which, when executed by the processor, configure the processor to schedule a non-contention based Physical Random Access Channel (PRACH) procedure with a scheduled preamble index, wherein the preamble index is to indicate the selected TX beam index.

In Example 21, the subject matter of any one of Examples 19-20 can optionally include instructions which, when executed by the processor, configure the processor to transmit the selected TX beam index implicitly based on a 5G Physical Downlink Control Channel (xPDCCH).

In Example 22 the subject matter of any one of Examples 19-21 can optionally include instructions which, when executed by the processor, configure the processor to configure the UE a neighbor TX beam index list via Radio Resource Control (RRC) signaling.

In Example 23 the subject matter of any one of Examples 19-21 can optionally include instructions which, when executed by the processor, configure the processor to maintain a neighbor TX beam index list, wherein the selected TX beam index may be included in the neighbor TX beam index list.

In Example 24 the subject matter of any one of Examples 19-21 can optionally include instructions which, when executed by the processor, configure the processor to generate a scramble sequence based on the selected TX beam index, wherein the scramble sequence is used to generate a UE-specific RS associated with the xPDCCH.

In Example 25 the subject matter of any one of Examples 19-21 can optionally include instructions which, when executed by the processor, configure the processor to generate a Cyclic Redundancy Check (CRC) code for the xPDCCH based on a Radio Network Temporary Identity (RNTI) and the selected TX beam index.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus of an evolved Node B (eNB) comprising processor coupled to memory to:
   configure a periodic transmit (TX) beamforming process for a user equipment (UE), wherein a plurality of different TX beams are used in a plurality of different beamforming reference signals (BRS);
   receive, from the UE, a selected TX beam index which identifies a selected TX beam;
   schedule subsequent transmissions to the UE on the selected TX beam;
   receive, from the UE, a signal indicating a BRS Receiving Power (BRS-RP) was received based on a new RX beam wherein a BRS is transmitted in a time division duplex (TDD) guard band in a subframe which precedes a fixed downlink subframe;
   transmit the selected measured TX beam index to the UE via RRC signaling; and
   schedule a first Channel State Information (CSI) process for a first RX beam measurement and a second CSI process for a second RX beam measurement.

2. The apparatus of claim 1, further comprising circuitry to schedule a non-contention based Physical Random Access Channel (PRACH) procedure with a scheduled preamble index, wherein the preamble index is to indicate the selected TX beam index.

3. The apparatus of claim 1, further comprising circuitry to transmit the selected TX beam index implicitly based on a fifth generation (5G) Physical Downlink Control Channel (xPDCCH).

4. The apparatus of claim 3, further comprising circuitry to configure the UE a neighbor TX beam index list via Radio Resource Control (RRC) signaling.

5. The apparatus of claim 4, further comprising circuitry to maintain the neighbor TX beam index list, wherein the selected TX beam index may be included in the neighbor TX beam index list.

6. The apparatus of claim 3, further comprising circuitry to generate a scramble sequence based on the selected TX beam index, wherein the scramble sequence is used to generate a UE-specific RS associated with the xPDCCH.

7. The apparatus of claim 3, further comprising circuitry to generate a Cyclic Redundancy Check (CRC) code for the xPDCCH based on a Radio Network Temporary Identity (RNTI) and the selected TX beam index.

8. The apparatus of claim 1, wherein the selected TX beam index is transmitted in a Downlink Control Information (DCI).

9. The apparatus of claim 1, further comprising circuitry to configure a BRS resource via RRC signaling.

10. A non-transitory machine-readable medium comprising instructions which, when executed by a processor in an apparatus of an evolved Node B (eNB), configure the processor to:
configure a periodic transmit (TX) beamforming process for a user equipment (UE), wherein a plurality of different TX beams are used in a plurality of different beamforming reference signals (BRS);
receive, from the UE, a selected TX beam index which identifies a selected TX beam;
schedule subsequent transmissions to the UE on the selected TX beam;
receive, from the UE, a signal indicating a BRS Receiving Power (BRS-RP) was received based on a new RX beam wherein a BRS is transmitted in a time division duplex (TDD) guard band in a subframe which precedes a fixed downlink subframe;
transmit the selected measured TX beam index to the UE via RRC signaling; and
schedule a first Channel State Information (CSI) process for a first RX beam measurement and a second CSI process for a second RX beam measurement.

11. The non-transitory machine-readable medium of claim 10, further comprising instructions which, when executed by the processor, configure the processor to:
schedule a non-contention based Physical Random Access Channel (PRACH) procedure with a scheduled preamble index, wherein the preamble index is to indicate the selected TX beam index.

12. The non-transitory machine-readable medium of claim 10, further comprising instructions which, when executed by the processor, configure the processor to transmit the selected TX beam index implicitly based on a fifth generation (5G) Physical Downlink Control Channel (xPDCCH).

13. The non-transitory machine-readable medium of claim 12, further comprising instructions which, when executed by the processor, configure the processor to:
configure the UE a neighbor TX beam index list via Radio Resource Control (RRC) signaling.

14. The non-transitory machine-readable medium of claim 13, further comprising instructions which, when executed by the processor, configure the processor to:
maintain the neighbor TX beam index list, wherein the selected TX beam index may be included in the neighbor TX beam index list.

15. The non-transitory machine-readable medium of claim 13, further comprising instructions which, when executed by the processor, configure the processor to:
generate a scramble sequence based on the selected TX beam index, wherein the scramble sequence is used to generate a UE-specific RS associated with the xPDCCH.

16. The non-transitory machine-readable medium of claim 10, further comprising instructions which, when executed by the processor, configure the processor to:
generate a Cyclic Redundancy Check (CRC) code for the xPDCCH based on a Radio Network Temporary Identity (RNTI) and the selected TX beam index.

* * * * *